(12) United States Patent
Incesu et al.

(10) Patent No.: US 8,934,534 B2
(45) Date of Patent: Jan. 13, 2015

(54) METHOD AND SYSTEM FOR PROVIDING RELIABLE MOTION VECTORS

(75) Inventors: Yalcin Incesu, Heidelberg (DE); Volker Freiburg, Stuttgart (DE); Oliver Erdler, Ostfildern-Ruit (DE)

(73) Assignee: Sony Corporation, Tokyo (JP)

( * ) Notice: Subject to any disclaimer, the term of this patent is extended or adjusted under 35 U.S.C. 154(b) by 390 days.

(21) Appl. No.: 12/623,021

(22) Filed: Nov. 20, 2009

(65) Prior Publication Data

US 2010/0225768 A1 Sep. 9, 2010

(30) Foreign Application Priority Data

Mar. 5, 2009 (EP) .................................... 09154407

(51) Int. Cl.
| | | |
|---|---|---|
| *H04N 7/12* | (2006.01) | |
| *H04N 11/04* | (2006.01) | |
| *H04N 11/20* | (2006.01) | |
| *H04N 7/01* | (2006.01) | |
| *G06K 9/36* | (2006.01) | |
| *H04N 5/14* | (2006.01) | |
| *H04N 19/51* | (2014.01) | |
| *H04N 19/553* | (2014.01) | |

(52) U.S. Cl.
CPC ......... *H04N 5/145* (2013.01); *H04N 19/00703* (2013.01); *H04N 19/00648* (2013.01)
USPC ............ 375/240.01; 375/240.16; 375/240.13; 348/452; 348/441; 382/236

(58) Field of Classification Search
None
See application file for complete search history.

(56) References Cited

U.S. PATENT DOCUMENTS

| | | | |
|---|---|---|---|
| 5,859,668 A * | 1/1999 | Aono et al. .................... | 348/699 |
| 6,219,436 B1 | 4/2001 | De Haan et al. | |
| 6,487,313 B1 | 11/2002 | De Haan et al. | |
| 7,142,600 B1 | 11/2006 | Schonfeld et al. | |
| 2004/0174459 A1* | 9/2004 | Holt et al. ...................... | 348/452 |
| 2005/0163355 A1 | 7/2005 | Mertens | |
| 2005/0281333 A1* | 12/2005 | Ghanbari ................. | 375/240.16 |
| 2006/0017843 A1* | 1/2006 | Shi et al. ........................ | 348/441 |
| 2006/0244866 A1 | 11/2006 | Kishida | |
| 2009/0052532 A1 | 2/2009 | Robinson | |
| 2009/0147853 A1* | 6/2009 | Dane et al. ............... | 375/240.16 |
| 2009/0207315 A1* | 8/2009 | Ikeda et al. .................... | 348/699 |
| 2010/0169248 A1* | 7/2010 | Iwamoto ......................... | 706/12 |
| 2011/0205438 A1* | 8/2011 | Blume .......................... | 348/607 |

FOREIGN PATENT DOCUMENTS

| | | |
|---|---|---|
| JP | 8-149479 | 6/1996 |
| WO | WO 2005/022922 A1 | 3/2005 |
| WO | WO 2007/119183 A2 | 10/2007 |

OTHER PUBLICATIONS

U.S. Appl. No. 14/109,139, filed Dec. 17, 2013, Incesu, et al.

\* cited by examiner

*Primary Examiner* — Frederick Bailey
(74) *Attorney, Agent, or Firm* — Oblon, Spivak, McClelland, Maier & Neustadt, L.L.P.

(57) ABSTRACT

The present invention relates to a method for providing reliable motion vectors, comprising the steps of determining motion vectors between two image frames with backward and forward estimation, comparing backward estimation motion vectors and forward estimation motion vectors, and detecting unreliable motion vectors based on the comparison result.
The present invention further relates to a system for providing reliable motion vectors.

9 Claims, 11 Drawing Sheets

Fig. 1

PRIOR ART

METHOD AND SYSTEM FOR PROVIDING RELIABLE MOTION VECTORS

The present invention relates to a method for providing reliable motion vectors and to a system for providing reliable motion vectors. Specifically, the present invention relates to the detection and removal of unreliable motion vectors.

Motion vectors are an important task in the field of image processing. There is a constant need for picture improvement, which includes motion estimation as well as methods utilizing motion vectors to improve the picture quality, e.g. motion compensated interpolation techniques. One technique which converts from 24 Hertz/25 Hertz/50 Hertz/60 Hertz to 100 Hertz/120 Hertz to reduce motion blur and judder effects requires a continuous improvement of the algorithms including also the motion estimation.

Motion estimation methods and systems fail for regions where there is the case of covering or uncovering background. The motion vectors assigned to those covered or uncovered regions are typically non-picture related and randomly distributed motion vectors. This is exemplary shown in FIG. 1.

Figure 1:
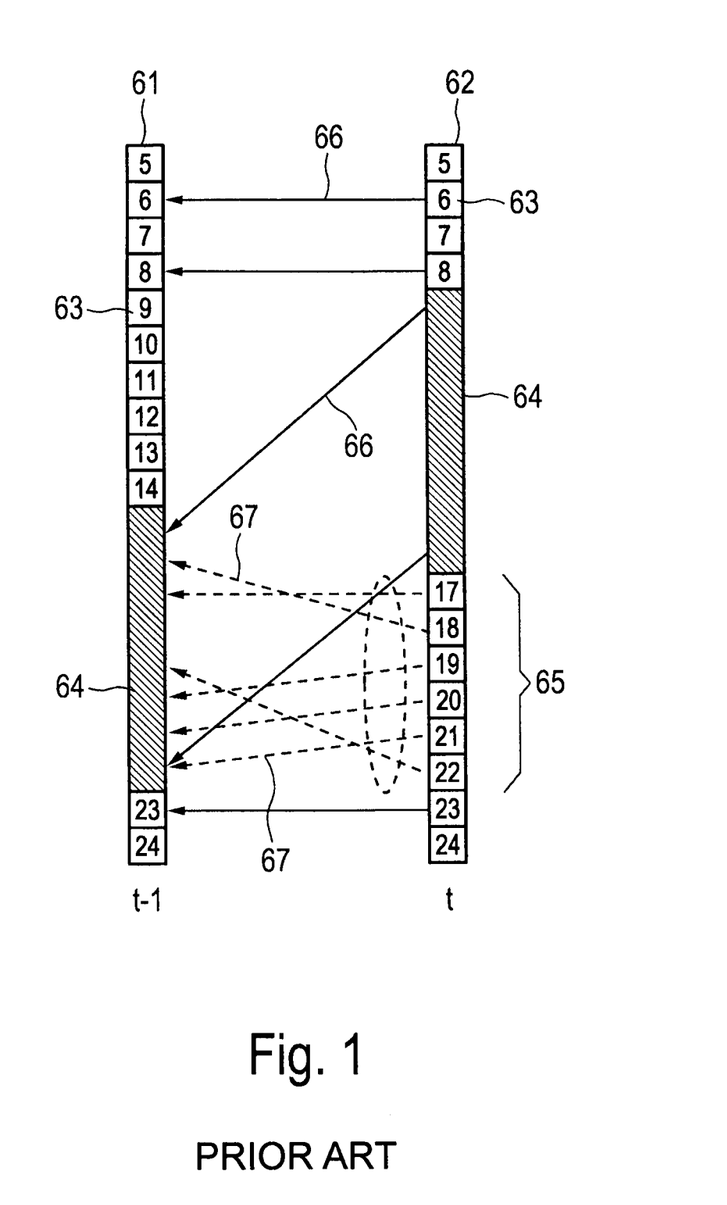
FIG. 1 shows a schematic diagram of a backward motion estimation.

In FIG. 1 two image frames at different times or two parts of image frames at different times are shown. The earlier point in time is designated with t−1 and the earlier point in time is designated with t. Each of the shown image frames has several blocks 63 corresponding to one or more pixels. Hereby, the two image frames or parts of image frames shown in FIG. 1 show the same blocks 63 or pixels at different times.

The blocks 63 are coloured in different ways thereby indicating background blocks and an object 64. The object 64 is indicated by black blocks and is moving, i.e. changing its position within the image, between the image frame at earlier time 61 to the image frame at later time 62. The white blocks 63 are background.

In the shown case of a backward motion estimation process to every position in the image frame at later time 62 a position in the image frame at earlier time 61 is assigned. This is indicated by motion vectors 66, 67. As can be seen for example to block number 6 within the image frame at later time 62 the block number 6 in the image frame at earlier time 61 is assigned by a motion vector 66. Likewise, via a motion vector 66 to the upper block of the object 64 in the image frame at later time 62 the upper block of the object 64 in the image frame at earlier time 61 is assigned.

A problem arises with the uncovered region 65, which in the present example comprises background blocks number 17 to 22 in the image frame at later time 62. For these blocks there is no corresponding block in the image frame at earlier time. What happens in this moment is that random motion vectors 67 (shown with dashed lines in FIG. 1) are generated for the background blocks of the uncovered region 65, which do not describe the real motion correctly.

These random motion vectors 67, which do not describe the real motion correctly, nevertheless are used in later motion vector based processing, for instance projection of motion vectors and intermediate picture interpolation. This lowers the quality of the final interpolation result significantly, for instance at boarders of the picture with global panning motion. The same problem arises in covered regions in the case of forward motion estimation.

In document U.S. Pat. No. 6,487,313 a system and method is proposed to improve the interpolation results by determining the covered and uncovered regions based on a motion vector field and its neighbourhood discontinuities. As indicated before the motion vectors in covered or uncovered regions have the property not to correlate with the real present motion. Therefore, those regions cannot be used to reliably detect the uncovered regions and the quality of the interpolated picture or any other motion vector based processing will suffer consequentially.

In documents U.S. Pat. No. 6,219,436 and US 2005163355 a system and method is provided where the motion vector field discontinuities are extended to use forward and backward estimated motion vector fields. This method also relates to the detection of cover and uncover based on neighbourhood discontinuities, where the same problems as described above arise.

Document US 20060244866 A1 addresses to remove random motion vectors in its system of motion estimation. It is therefore proposed to check the neighbourhood relations based on statistically calculated random factors and to do a simple thresholding. Thereby, neighbourhood relations of motion vectors over time are used to identify the randomness. The proposed method is thus very unreliable since also motion vectors corresponding to the real motion of objects may be identified as random vectors.

It is therefore the object of the present invention to improve the prior art. Specifically, it is the object of the present invention to reduce the problems of the prior art.

The present invention relates to a method for providing reliable motion vectors, comprising the steps of determining motion vectors between two image frames with backward and forward estimation, comparing backward estimation motion vectors and forward estimation motion vectors, and detecting unreliable motion vectors based on the comparison result.

The present invention further relates to a system for providing reliable motion vectors, comprising a backward estimation means for determining motion vectors between two image frames with backward estimation, a forward estimation means for determining motion vectors between two image frames with forward estimation, a comparison means for comparing backward estimation motion vectors and forward estimation motion vectors, and a detection means for detecting unreliable motion vectors based on the comparison result.

Preferably, one block within one image frame is selected as block under test, and the backward estimation motion vector and forward estimation motion vector associated to the selected block are compared.

Advantageously, the unreliable motion vectors are removed. Further advantageously, the removed motion vectors are replaced with reliable motion vectors.

In a preferred embodiment the following steps are provided: selecting as block under test a block within the image frame at later time, determining the backward estimation motion vector for the block under test, finding block within the image frame at earlier time to which backward estimation motion vector is pointing, determining the forward estimation motion vector for the found block, and comparing the determined backward estimation motion vector and the determined forward estimation motion vector.

In the preferred embodiment, the following steps are further provided: selecting as block under test a block within the image frame at earlier time, determining the forward estimation motion vector for the block under test, finding block within the image frame at later time to which forward estimation motion vector is pointing, determining the backward estimation motion vector for the found block, and comparing the determined forward estimation motion vector and the determined backward estimation motion vector.

Preferably, for comparing the motion vectors the vector distance between the compared motion vectors is calculated, preferably based on the Euclidian or Manhattan distance.

Further, preferably, for comparing it is detected whether the calculated vector distance exceeds a predefined threshold.

Further features, advantages and objects of the present invention will become evident by means of the figures of the enclosed drawings as well as by the following detailed explanation of illustrative-only embodiments of the present invention.

As already explained, there exist various algorithms and processing types which rely upon motion vectors. All methods require the use of reliable motion vectors and therefore suffer from a reduced quality and reliability in case that unreliable motion vectors are present. In the following, as an example, the problems arising with unreliable motion vectors will be explained with reference to image frame interpolation. But it is to be noted, that the present invention is not limited to the application of image frame interpolation but can be adopted in any other type of motion vector based image processing.

Figure 2A:
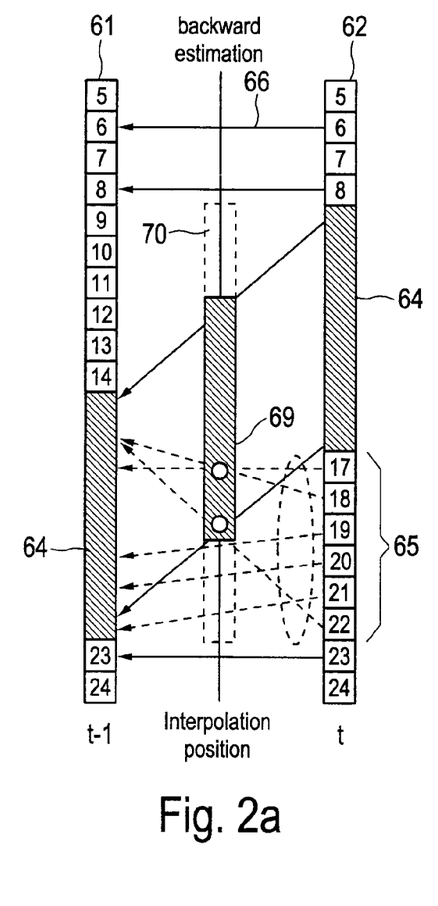
FIGS. 2a to 2c show schematic diagrams for interpolating between two image frames.

FIG. 2a shows an image frame 61 at an earlier point in time t−1 and an image frame 62 at a later point in time t. Between these image frames an interpolated image frame has to be created. For this purpose, as previously explained, backward estimation motion vectors are created. This again results in the problem that in the case of an uncovered region 65 random motion vectors which are not reliable are created. This results in multiple projection points 69, which are shown with white dots 69 in the interpolated object. These multiple projection points 69 are points to which more than one motion vector is pointing.

Figure 2B:
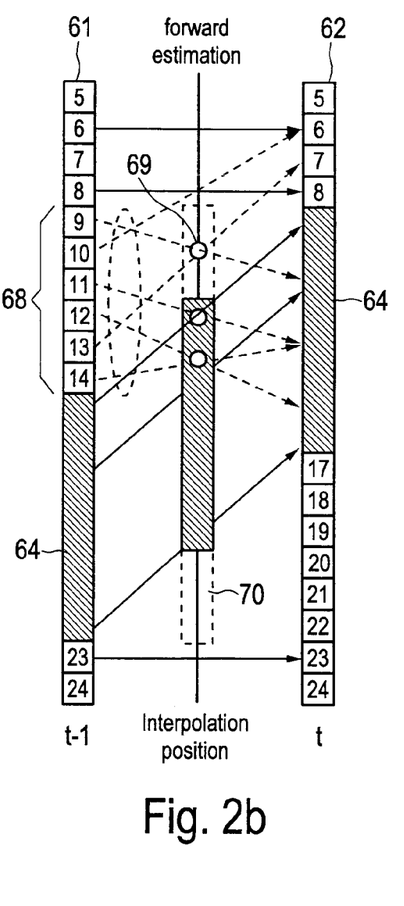

Likewise, FIG. 2b shows forward estimation motion vectors for the same two time frames 61, 62. In this case, a problem arises for the covered region 68, which in the present example is shown by blocks number 9 to 14, so that the forward estimation motion vectors being assigned to the covered region 68 again are not reliable. Also in FIG. 2b multiple projection points 69 are created in the interpolated position, where multiple projections of motion vectors exist.

Figure 2C:
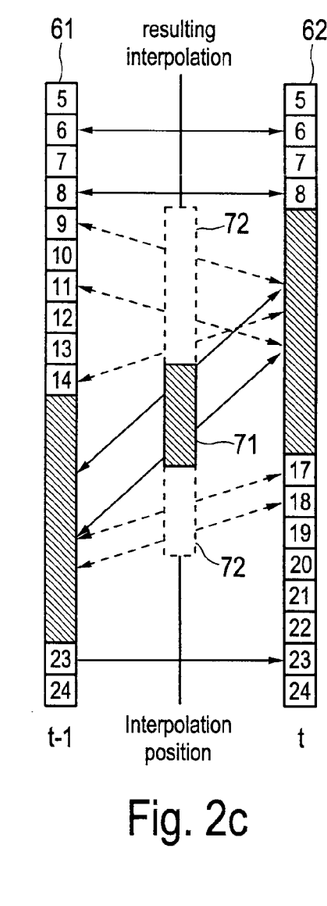

In FIG. 2c the resulting interpolated object is shown. As can be seen the object comprises a reliable region 71, which was created based on reliable motion vectors, and two unreliable regions 72, which were creating using also unreliable motion vectors and which in fact do not correspond to the real movement of the object 64. The resulting interpolated object is therefore unreliable and results in errors in the displayed image.

The problems with unreliable and randomly created motion vectors has been explained with reference to interpolation. But similar problems also arise when using other motion vector based algorithms and processing methods, since unreliable motion vectors always result in a significant reduction of image quality.

The present invention therefore proposes to adopt a method and system which can reliably detect unreliable motion vectors, so that the unreliable motion vectors can be removed. Depending on the desired application the removed motion vectors can be replaced by other reliable vectors, so that the corrected motion vectors can then be used for further applications and processing methods with high quality.

The present invention bases on the idea of a bi-directional motion estimation between two image frames and checking the consistency of the motion vectors between the forward and backward motion estimation.

More concretely, the present invention proposes to determine the motion vectors between two image frames with backward and forward estimation, comparing backward estimation motion vectors and forward estimation motion vectors and detecting unreliable motion vectors based on the comparison result.

Figure 3:
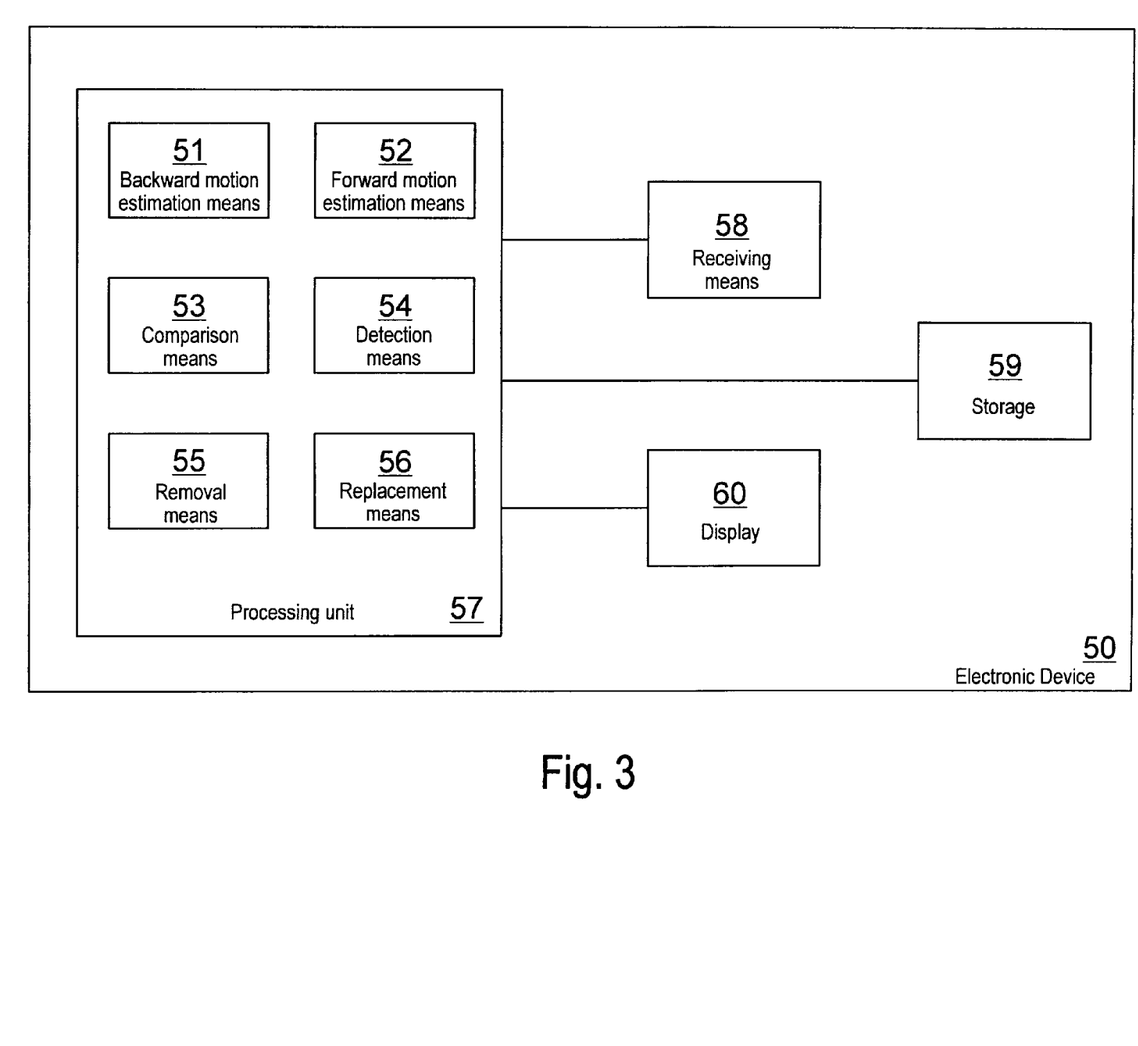
FIG. 3 shows a schematic block diagram of an electronic device comprising a system for providing reliable motion vectors according to the present invention.

FIG. 3 shows an electronic device 50 adopting a system according to the present invention. The electronic device can for example be a television or any other electronic device having the need to provide an enhanced image quality by use of motion vector based algorithms.

The electronic device 50 comprises a receiving means 58 which receives the image frames of the video signal. The electronic device 50 further comprises a storage 59 and a display 60 for displaying the processed video images. The storage 59 can comprises on or more storage parts of volatile and/or non-volatile memory. The display 60 can be any type of know of future display, e.g. a liquid crystal display (LCD) or the like.

The receiving means 58, the storage 59 and the display 60 are connected to and in data communication with a processing unit 57, which supervises all processes within the electronic device 50.

The processing unit 57 according to the present invention comprises several components 51 to 56 adapted to carry out the steps according to the present invention. The components 51 to 56 can hereby either be processing steps within the inventive algorithms or can be hardware components for carrying out the respective algorithm steps.

Specifically, the processing unit 57 comprises a backward motion estimation means 51 for determining motion vectors between two image frames with backward motion estimation. The processing unit 57 further comprises a forward motion estimation means for determining motion vectors between two image frames with forward estimation. A comparison means 53 is adapted to compare backward estimation motion vectors and forward estimation motion vectors. A detection means 54 then detects unreliable motion vectors based on the comparison result submitted by the comparison means 53.

There can further be provided a removal means 55 for removing the unreliable motion vectors, which were previously detected by the detection means 54. Depending on the desired application, the removed unreliable motion vectors can be replaced by corrected or reliable motion vectors by the replacement means 56.

The electronic device 50 is not limited to the components shown in FIG. 3, but comprises all further components necessary for the functionality of the electronic device 50, e.g. a battery, a power source or the like, which are omitted in the figure for the sake of clarity.

Figure 4:
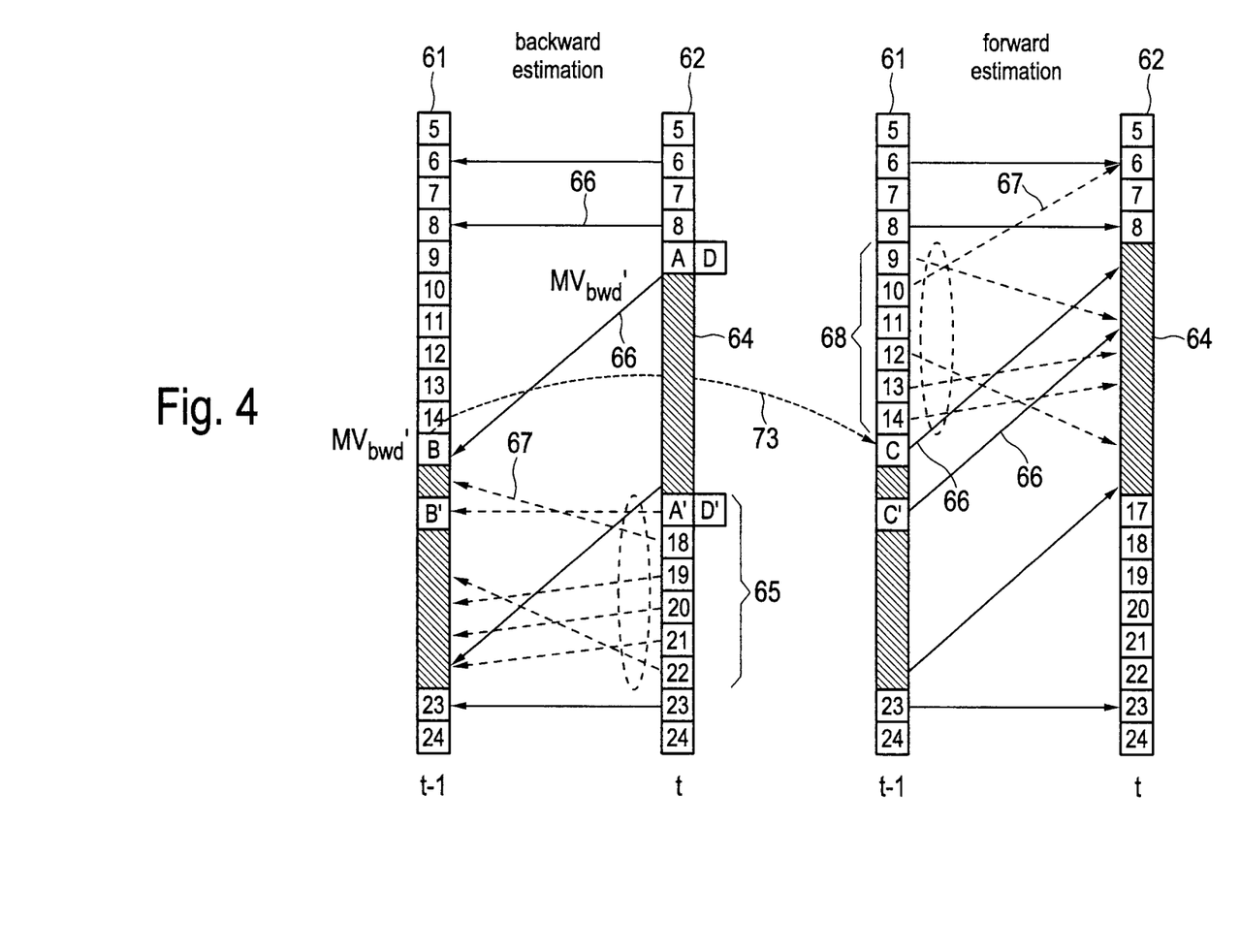
FIG. 4 shows a schematic diagram of the method for detecting unreliable motion vectors according to the present invention.

FIG. 4 shows a schematic diagram showing the process steps of the present invention for detecting unreliable, i.e. randomly created motion vectors. As already explained, according to the present invention a bi-directional motion estimation is used. For this purpose between two image frames 61, 62 the backward estimation motion vectors and the forward estimation motion vectors are determined. In the case of backward estimation as already explained a problem arises with the blocks within the uncovered region 65, which result in unreliable backward estimation motion vectors. Likewise, in the forward estimation a problem arises in the case of a covered region 68, which results in unreliable forward estimation motion vectors.

It is to be noted, that the image frames shown in the figures do not necessarily represent complete image frames but can also represent only a part of an image frame. Nevertheless, the term "image frames" will be used in the present application for complete as well as for partial image frames. Further, the shown blocks can comprise on or more pixels depending on the used algorithm and application.

In FIG. 4 for the sake of clarity the image frame at earlier time 61 as well as the image frame at later time 62 is shown twice, i.e. once for the backward motion estimation and once for the forward motion estimation. An insertion of forward estimation motion vectors and backward estimation motion vectors into one single image would render FIG. 4 unclear.

The present invention now proposes to compare the backward estimation motion vectors and the forward estimation motion vectors and to apply a consistency check.

This will be explained with reference to FIG. 4. In the image frame at later time 62 one block is selected as block under test. In the present example this block is designated with A. Then it is determined, to which block in the image frame at earlier time 61 the backward estimation motion vector $MV_{bwd}$ is pointing. In the present example the corresponding motion vector is pointing to block B, i.e. $MV_{bwd}'=MV_{bwd}(X+MV_{bwd})$.

For this found block B in the image frame at earlier time 61 then in a next step the corresponding forward estimation motion vector is determined. Since in the present FIG. 4 the same image frames are shown twice, i.e. once for forward estimation and once for backward estimation, a block C in the forward estimation image is indicated by an arrow 73 starting at block B in the backward estimation image. Even though blocks B and C are shown in different images, these blocks are identical. For block C (being identical to block B) the corresponding forward estimation motion vector is then determined.

The determined forward estimation motion vector and the previously determined backward estimation motion vector are then compared and a consistency check is applied, i.e. the similarity between $MV_{bwd}'$ and $-MV_{fwd}$ is applied. In other words, if the forward estimation motion vector associated to block C is pointing to a block in the image frame at later time 62 corresponding to block A, then this means in consequence that the backward estimation motion vector associated to block A is reliable. The block A under test and the corresponding backward estimation motion vector are thus marked as reliable.

In a further example, an unreliable motion vector will be explained also with reference to FIG. 4. In this example the block under test is block A'. The backward estimation motion vector points to block B'. As previously explained, block B' corresponds to block C' and in the next step the forward estimation motion vector associated to block C' is determined. As can be seen this forward estimation motion vector is not similar to the backward estimation motion vector pointing to block B'. The motion vector starting from block A' is therefore marked as not reliable.

Various methods are applicable to check the similarity between two motion vectors. One is to use a simple vector distance (e.g. Euclidian, Manhattan or other distances) between the two motion vectors.

Another possibility is to use one of the previously mentioned distances and evaluate more information. For instance the matching criteria that were used to generate the motion vector. An example will be given in the following: In block-matching motion estimation methods usually the block-based displacement frame difference value is utilized as a matching criterion. This could be used in addition to distances to provide a more sophisticated motion vector similarity measure. Since a single decision of similarity needs to be obtained it may be necessary to introduce a condition that clarifies if motion vectors are similar or not. In the case of a simple distance measurement, which provides a scalar result, this can be done using a threshold. For instance $d=\|MV_{bwd}'+MV_{fwd}'\|>$predefined threshold. If d is larger, it can be assumes that the motion vectors differ and $MV_{bwd}$ is marked as uncover vector.

In many hardware related applications it is highly requested to have low memory usage. Specifically, in the case of a television the storage and processing capacities usually are quite limited. The memory usage relies very much on free access on vertical information (line buffers) as it is the case for vertical motion vector access. In one embodiment of the present invention therefore a method is proposed that uses less memory, but still provides the detection of covered or uncovered regions caused by horizontal motion. Instead of assignment of $MV_{bwd}'=MV_{bwd}(X+MV_{bwd})$ as done in the previously explained detection rule, only horizontal components of the motion vectors can be used, e.g. $MV_{bwd}'=MV_{bwd}(X+MV_{bwd,\ horizontal\ component})$. Similarity measures are still applied on the full motion vector.

With reference to FIGS. 5 to 8 now several examples will be given of how the algorithm according to the present invention could be implemented.

Figure 5:
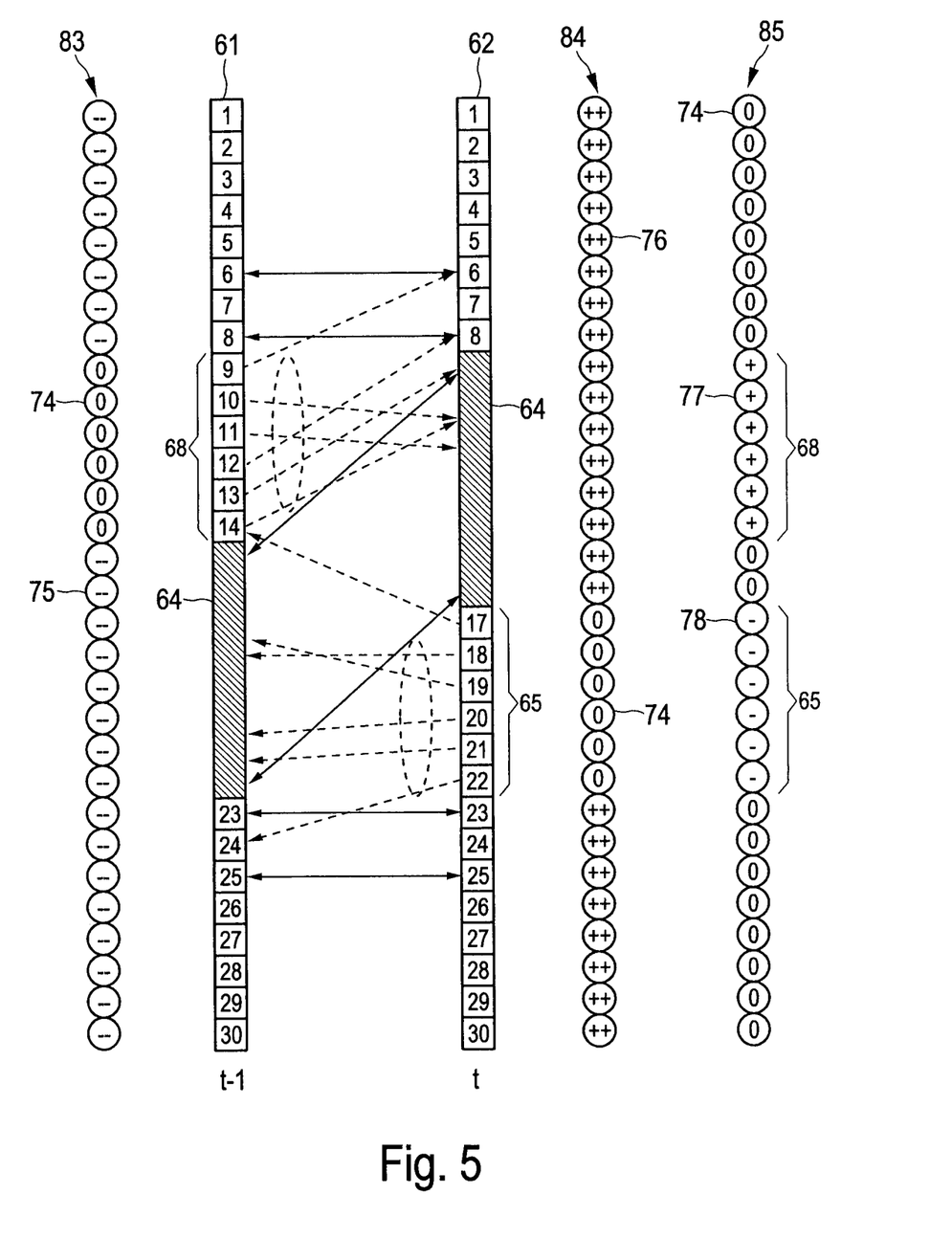
FIGS. 5 to 8 are different embodiments of detecting unreliable motion vectors according to the present invention.

FIG. 5 hereby shows the case where a static background is provided and where the motion is smaller than the object. In this figure in contrast to the FIG. 4, only one set of image frame at earlier time 61 and image frame at later time 62 is shown and the backward estimation motion vectors and forward estimation motion vectors are included into the same diagram.

As can be seen, in this case also the problem of an uncovered region 65 and a covered region 68 arises. In order to determine the unreliable motion vectors, the present invention in a preferred embodiment proposes to adopt indicators for indicating whether the covered case or the uncovered case occurs. This indicator can be a number, symbol or any other type of indicator. In the present embodiment, as indicators a zero "0", a minus "−", a double minus "−−", a plus "+" and a double plus "++" are used.

In a final indicator column 85 the finally calculated indicator for each block is shown. The final indicator at the beginning of the process is set to 0 for each block. Then with the previously described methods, unreliable backward estimation motion vectors and unreliable forward estimation motion vectors are determined.

In a forward indicator column 83 for each block in the image frame at earlier time 61 an indicator is determined based on the reliability of the forward estimation motion vectors, which defines, whether the final indicator should be kept, decreased or increased. In the present example there is a covered region 68. The forward estimation motion vectors for this covered region 68 with the previously explained methods are determined as unreliable. In the forward indicator column 83 for these unreliable motion vectors the indicator is set to zero 74. For the other motion vectors the indicator is set to double minus 75.

Likewise, in a backward indicator column 84 for each block in the image frame at later time 62 an indicator is determined based on the reliability of the backward estimation motion vectors, which defines, whether the final indicator should be kept, decreased or increased. In the present example there is an uncovered region 65. The backward estimation motion vectors for this uncovered region 65 with the previously explained methods are determined as unreliable. In the backward indicator column 84 for these unreliable motion vectors the indicator is set to zero 74. For the other motion vectors the indicator is set to double plus 76.

Now, the indicators of the forward indicator column 83 and of the backward indicator column 84 are used for determining, whether the initially set final indicator should be kept, decreased or increased. Hereby, a zero 74 defines that the final indicator should be kept constant, a double minus 75 defines that the final indicator should be decreased and a double plus 76 defines that the final indicator should be increased. These regulations are now applied to the initially set final indicator.

For blocks number 1 to 8 according to the forward indicator column 83 the final indicator should be decreased and according to the backward indicator column 84 the final indicator should be increased. This in sum results in keeping the final indicator constant, i.e. keeping the value of zero 74. For blocks number 9 to 14 according to the forward indicator column 83 the final indicator should be kept constant and according to the backward indicator column 84 the final indicator should be increased. This in sum results in a increased final indicator, which is shown in the final indicator column 85 with values of plus 77 for blocks number 9 to 14.

In the same way, the final indicator for the other blocks is determined, which results in a final indicator of zero 74 for blocks numbers 15 to 16 and 23 to 30 and in a indicator of minus 78 for blocks number 17 to 22. From this final indicator it can now be seen, that blocks having the final indicator plus 77 are blocks of covered region 68 and blocks having the final indicator minus 78 are blocks of uncovered region 65.

On this final indicator defining covered and uncovered regions, the further processing steps can be based. It is again to be noted, that the above embodiment is only one example of an implementation and that the present invention is not limited to the above described embodiment.

Figure 6:
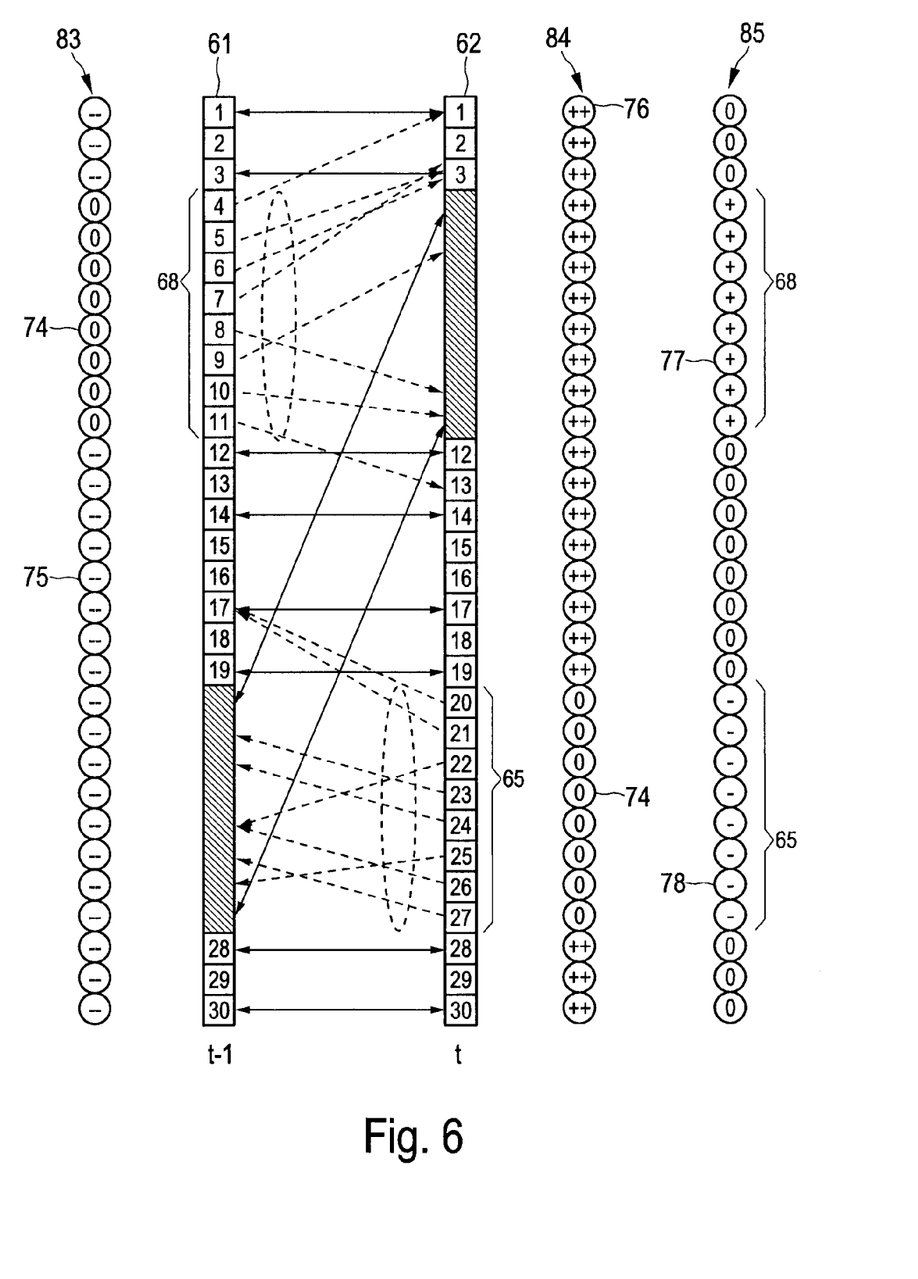

The same calculation method of the final indicator is shown in FIG. 6 for the case of a static background and a motion which is larger than the object.

Figure 7:
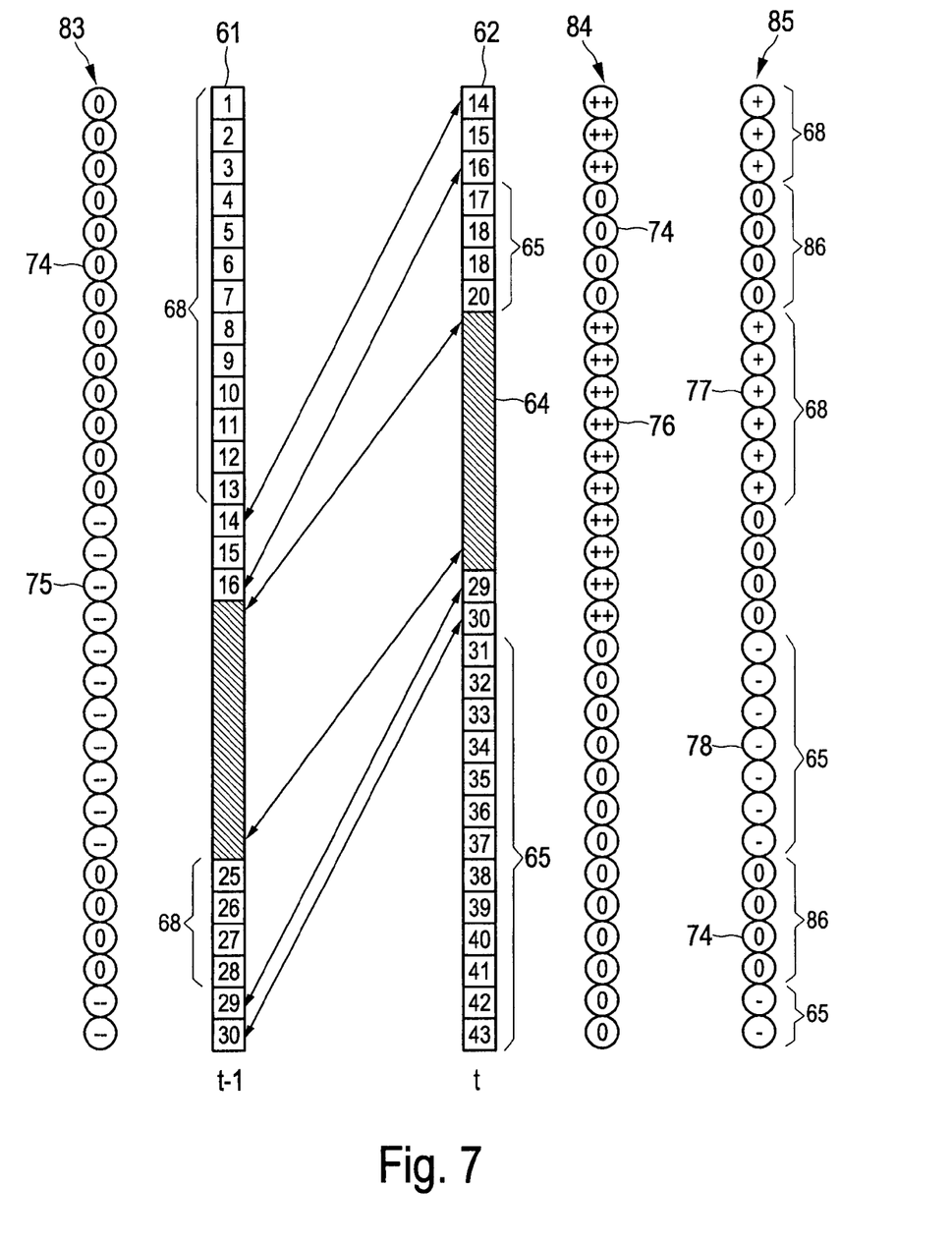

FIG. 7 shows the case of a moving background and a motion of the object in the same direction as the background. In this specific case it might happen, that the final indicator is set to zero if there is at the same time the case of covering and uncovering. This special final indicators 86 depending on the used algorithm can be detected as also indicating unreliable motion vectors and can be processed accordingly.

Figure 8:
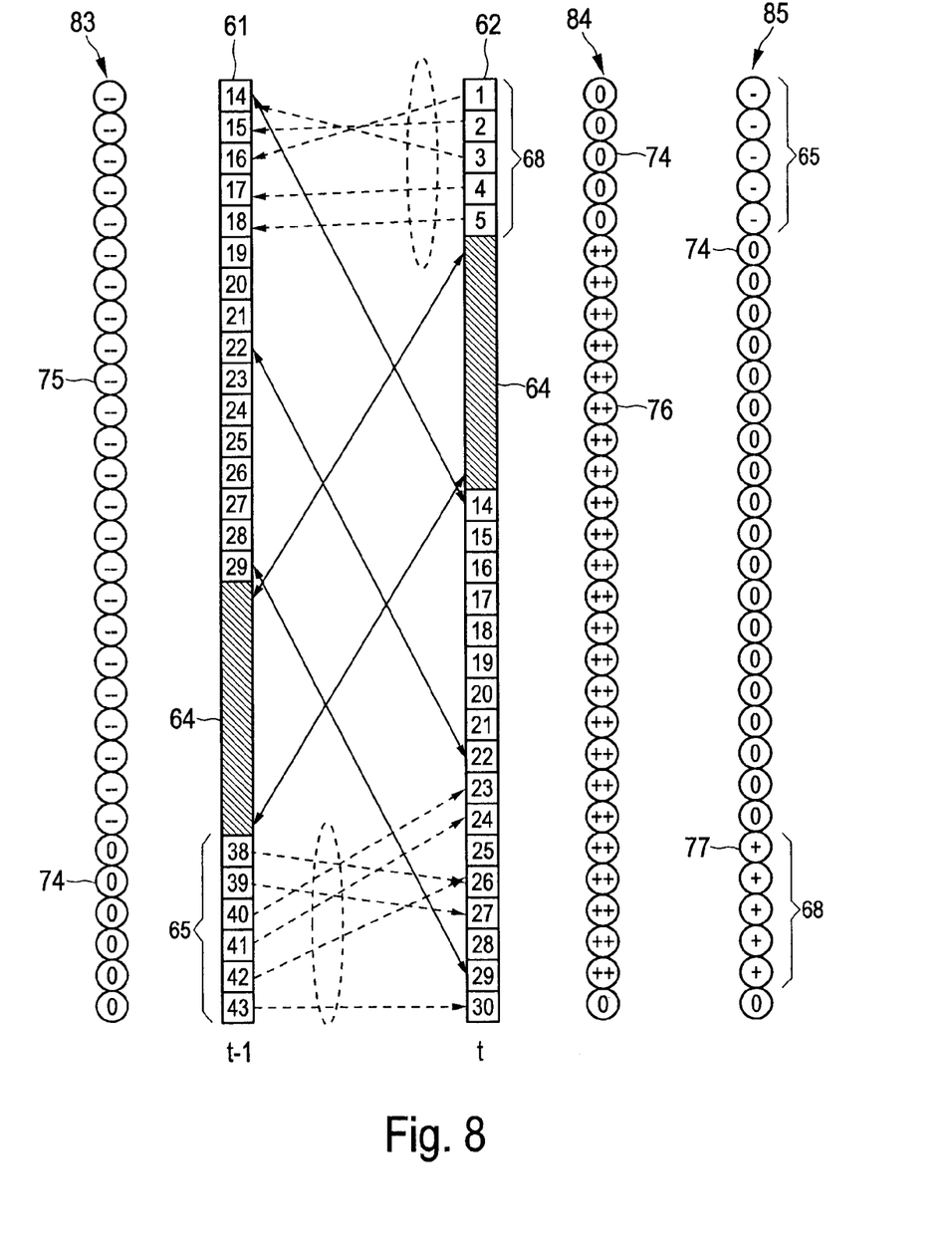

FIG. 8 shows the case of a moving background and a motion of the object in the opposite direction.

Figures 9A, 9B:
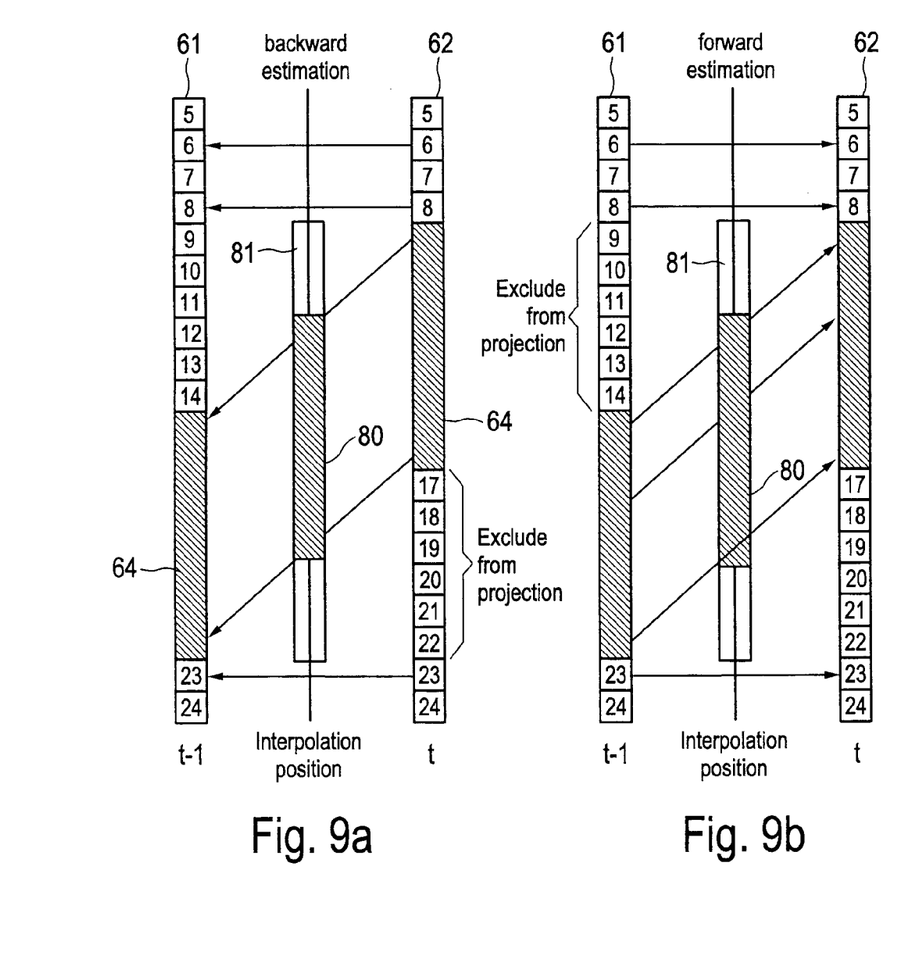
FIGS. 9a to 9c show schematic diagrams of a method for providing reliable motion vectors according to the present invention.
Figure 9C:
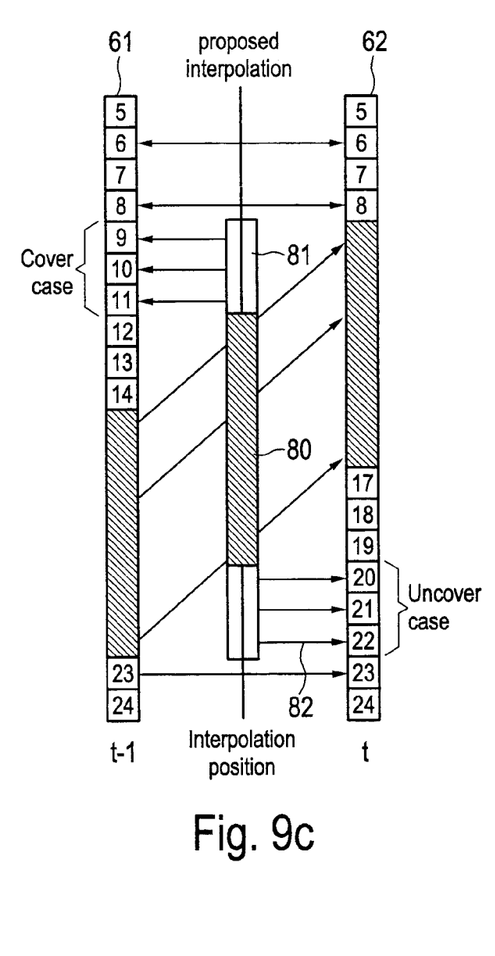

In FIGS. 9a to 9c an example of an application of the present invention is shown. Hereby, as an example an interpolation is shown using the uncover correction filter (UCF) according to the present invention.

Based on the presently described method unreliable backward estimation motion vectors and forward estimation motion vectors are detected. The covered and uncovered regions are then excluded from the projection.

In the final interpolated picture is shown in FIG. 9c and a reliable and projectable part of the object 80 is shown in black. The non-projectable regions 81 of the object are shown in white.

The intermediate positions that need to be interpolated are first preset with background motion vectors. Those background motion vectors must be determined prior either with a global motion parametrisation or other methods, e.g. by feedback of prior projection results. Then the cleaned motion vectors 82 are projected on the intermediate position allowing even the overwriting of the background motion vector initialised interpolation motion vector field. As can be seen in FIG. 9c the resulting interpolation motion vector field is not disturbed anymore by the randomly generated motion vectors from uncovered regions. The same process is applied to the forward estimation motion vectors and the cover case.

Since with the present invention the detection of covered and uncovered regions is accomplished very reliable, a good interpolation result or any other high quality process based on motion vectors can be adopted.

Figure 10:
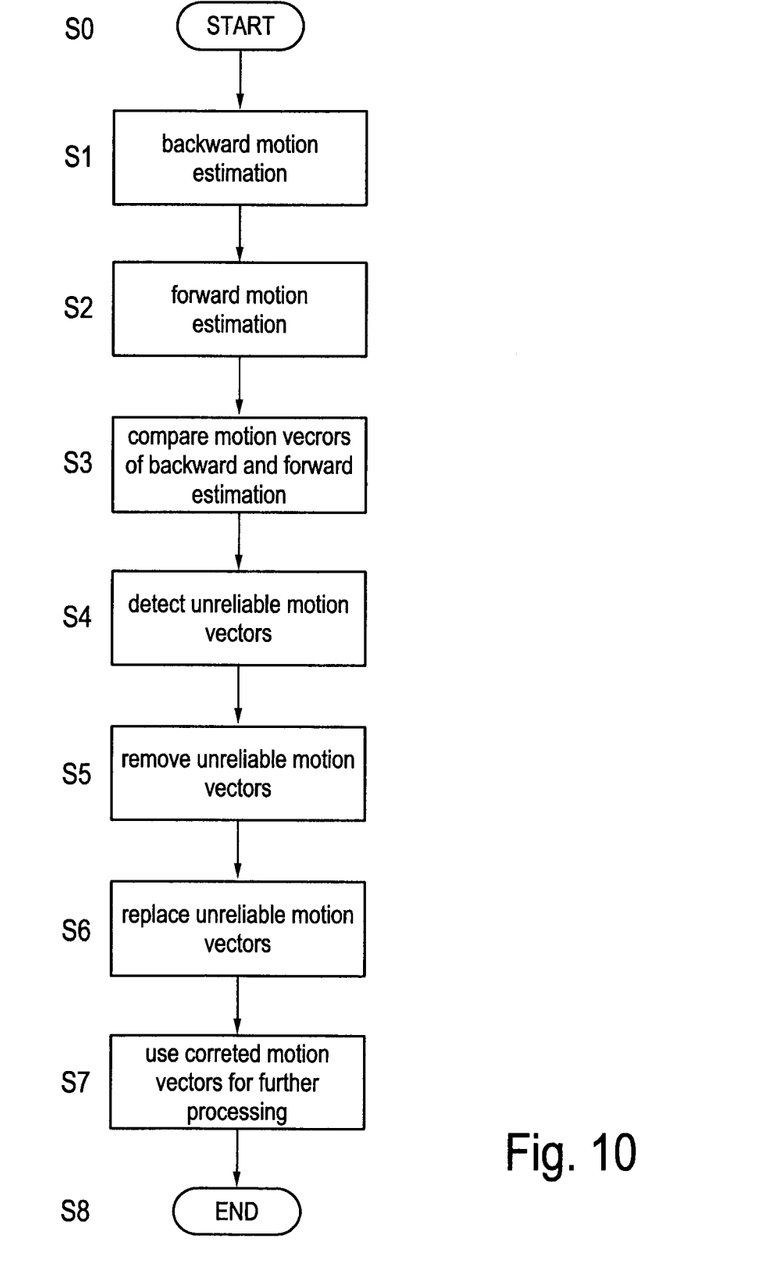
FIG. 10 is a flow chart showing the process steps of a method for providing reliable motion vectors according to the present invention.

In FIG. 10 now the basic idea of the present invention will be explained. FIG. 10 is hereby a flow chart of the process according to the present invention for providing reliable motion vectors.

The process starts in step S0. In step S1 the backward motion estimation is accomplished and in step S2 the forward motion estimation is accomplished. It is to be noted that steps S1 and S2 can also be accomplished at the same time or in a different order.

In step S3 the backward estimation motion vectors and forward estimation motion vectors are compared. Based on the comparison result in the next step S4 unreliable motion vectors are detected.

In the next step S5 the unreliable motion vectors are removed. Depending on the desired application the removed motion vectors can be replaced by reliable motion vectors in step S6. Then the corrected motion vectors in step S7, i.e. either the motion vectors without the unreliable motion vectors or the motion vectors including the replaced motion vectors can be used for further processing.

The process ends in step S8.

Figure 11:
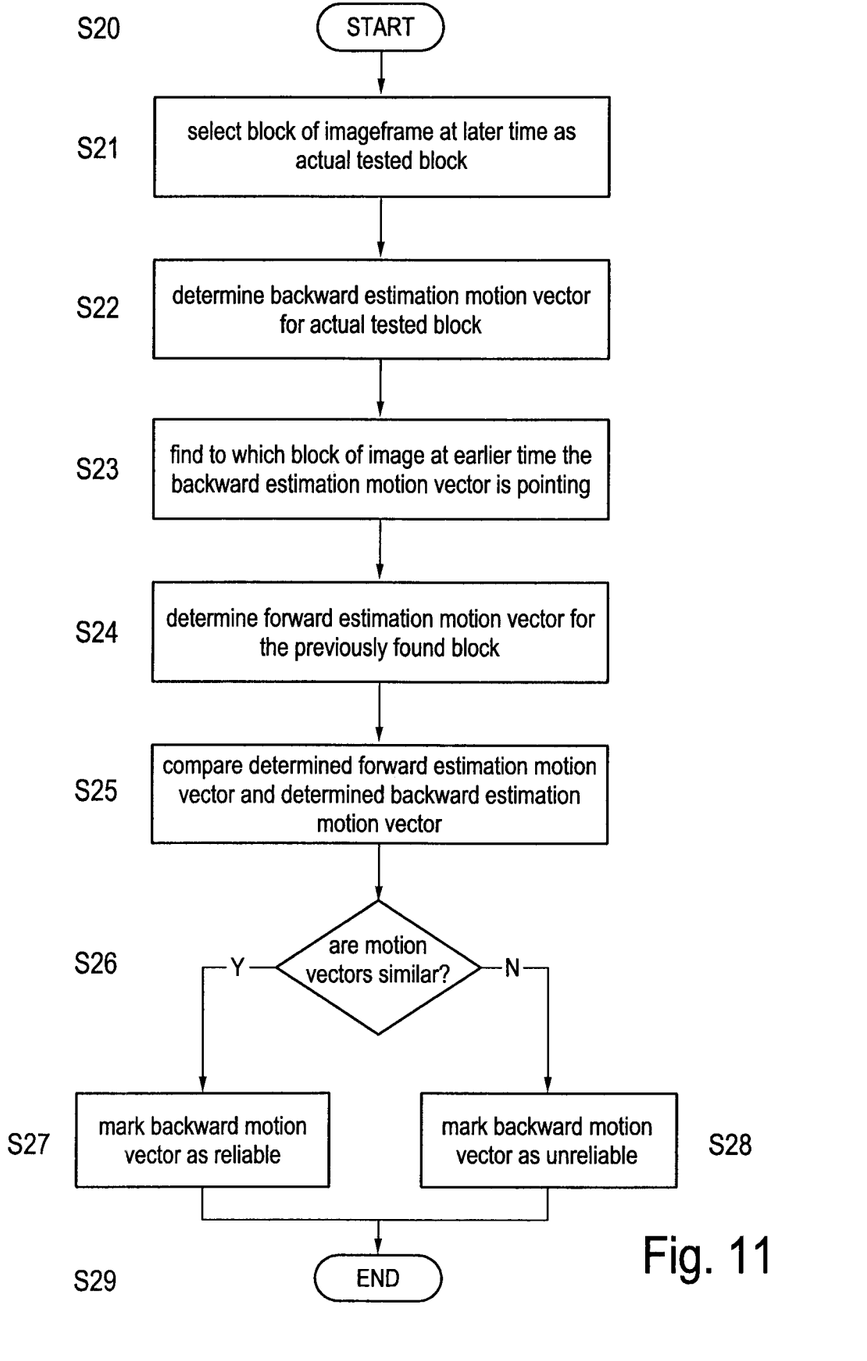
FIG. 11 is a flow chart showing the process steps of detecting unreliable motion vectors according to the present invention.

In FIG. 11 the process of the present invention for detecting unreliable motion vectors will be explained in more detail. The process will hereby be explained with reference to the case, where the reliability of backward estimation motion vectors is determined, but the process can of course be correspondingly adapted to the determination of reliability of forward estimation motion vectors.

The process starts in step S20. In step S21 a block of the image frame at later time is selected as actual tested block. In the next step S22 the backward estimation motion vector is determined for the actual tested block. In the next step S23 it is found to which block of the image frame at earlier time the backward estimation motion vector is pointing. In the next step S24 the forward estimation motion vector for the previously found block is determined.

In the following step S25 the determined forward estimation motion vector and the determined backward estimation motion vector are compared. In step S26 it is checked whether the motion vectors are similar or identical. If the motion vectors are similar, then the corresponding backward motion vector in step S27 is marked as reliable. Otherwise, if the motion vectors are not similar then in step S28 the backward motion vector is marked as unreliable.

The process ends in step S29.

It is to be noted that the present invention has been described with reference to FIGS. 4 and 11, where the uncover correction filter is used starting in the image frame at a later time. But it is to be noted that for detecting the reliability of forward estimation motion vectors the process is adapted correspondingly. In this case the process starts with a block at the image at the earlier time and then correspondingly the forward estimation motion vector for the actual tested block in the image frame at earlier time is determined. In this case it is found to which block of the image at later time the forward estimation motion vector is pointing and the corresponding backward estimation motion vector for the found block is determined. Then again both motion vectors are compared and the process continues as previously described.

Other applications with which the present invention can be used are for instance motion vector based video classification, object tracking or other motion vector related methods. Motion vector based video classification systems that use motion vectors to detect scene changes, global motion movements or other video features, can profit from the present invention, since the present invention suppresses erroneous motion vectors and herewith the noise in the motion vector field.

The invention claimed is:

1. A method for providing reliable motion vectors, comprising:
    determining, with a processor, motion vectors between a first image frame and a second image frame with backward and forward estimation, the first image frame preceding the second image frame;
    comparing, with the processor, backward estimation motion vectors and forward estimation motion vectors;
    detecting, with the processor, unreliable motion vectors based on a comparison result;
    determining, with the processor, image background regions covered by an object and image background regions left uncovered by the object based on unreliable motion vectors;
    removing, with the processor, the unreliable motion vectors; and
    replacing, with the processor, removed unreliable motion vectors with reliable, predetermined background motion vectors,
    wherein an unreliable motion vector is detected by
        selecting, as a block under test, a block within the second image frame using the processor,
        determining, with the processor, the backward estimation motion vector for the block under test,
        finding, with the processor, a block within the first image frame to which the backward estimation motion vector is pointing,
        determining, with the processor, the forward estimation motion vector for the block found within the first image frame, and
        comparing, with the processor, the determined backward estimation motion vector and the determined forward estimation motion vector, the determined backward motion vector being unreliable and subject to removal when the determined forward motion vector points to a block other than the block under test, and
    the image background regions covered by the object and the image background regions left uncovered by the object are determined by
        assigning, with the processor, a forward motion vector reliability indicator to each block in the first image frame based on a reliability determination for forward estimation motion vectors corresponding to each block,
        assigning, with the processor, a backward motion vector reliability indicator to each block in the second image frame based on a reliability determination for backward estimation motion vectors corresponding to each block, and
        computing, with the processor, a final indicator identifying an image background regions as covered by the object or as left uncovered by the object.

2. A system for providing reliable motion vectors, comprising:
    circuitry configured to
    determine motion vectors between a first image frame and a second image frame with backward estimation, the first image frame preceding the second image frame;
    determine motion vectors between the first and second image frames with forward estimation;
    compare backward estimation motion vectors and forward estimation motion vectors;
    detect unreliable motion vectors based on a comparison result;
    determine image background regions covered by an object and image background regions left uncovered by the object based on unreliable motion vectors;
    remove the unreliable motion vectors; and
    replace removed unreliable motion vectors with reliable, predetermined background motion vectors,
    wherein in comparing the backwards estimation motion vectors and the forward estimation motion vectors, the circuitry is further configured to
        select as a block under test a block within second image frame,
        determine the backward estimation motion vector for the block under test,
        find a block within the first frame to which the backward estimation motion vector is pointing,
        determine the forward estimation motion vector for the found block, and
        compare the determined backward estimation motion vector and the determined forward estimation motion vector, the determined backward motion vector being unreliable and subject to removal when the determined forward motion vector points to a block other than the block under test, and
    in determining the image background regions covered by the object and the image background regions left uncovered by the object to, the circuitry is further configured to
        assign a forward motion vector reliability indicator to each block in the first image frame based on a reliability determination for forward estimation motion vectors corresponding to each block,
        assign a backward motion vector reliability indicator to each block in the second image frame based on a reliability determination for backward estimation motion vectors corresponding to each block, and
        compute a final indicator identifying an image background regions as covered by the object or as left uncovered by the object.

3. A non-transitory computer-readable medium having computer-readable instructions stored thereon, the computer-readable instructions when executed by a computer cause the computer to perform the method comprising:

determining motion vectors between a first image frame and a second image frame with backward and forward estimation, the first image frame preceding the second image frame;

comparing backward estimation motion vectors and forward estimation motion vectors;

detecting unreliable motion vectors based on a the comparison result;

determining image background regions covered by an object and image background regions left uncovered by the object based on unreliable motion vectors;

removing the unreliable motion vectors; and replacing removed unreliable motion vectors with reliable, predetermined background motion vectors, wherein an unreliable motion vector is detected by
- selecting as a block under test a block within the second image frame,
- determining the backward estimation motion vector for the block under test,
- finding a block within the first image frame to which backward estimation motion vector is pointing,
- determining the forward estimation motion vector for the found block, and
- comparing the determined backward estimation motion vector and the determined forward estimation motion vector, the determined backward motion vector being unreliable and subject to removal when the determined forward motion vector points to a block other than the block under test, and the image background regions covered by the object and the image background regions left uncovered by the object are determined by
- assigning a forward motion vector reliability indicator to each block in the first image frame based on a reliability determination for forward estimation motion vectors corresponding to each block,
- assigning a backward motion vector reliability indicator to each block in the second image frame based on a reliability determination for backward estimation motion vectors corresponding to each block, and
- computing a final indicator identifying an image background regions as covered by the object or as left uncovered by the object.

4. A method for providing reliable motion vectors, comprising:

determining, with a processor, motion vectors between a first image frame and a second image frame with backward and forward estimation, the first image frame preceding the second image frame;

comparing, with the processor, backward estimation motion vectors and forward estimation motion vectors;

detecting, with the processor, unreliable motion vectors based on a comparison result;

determine, with the processor, image background regions covered by an object and image background regions left uncovered by the object based on unreliable motion vectors;

removing, with the processor, the unreliable motion vectors; and replacing, with the processor, removed unreliable motion vectors with reliable, predetermined background motion vectors, wherein an unreliable motion vector is detected by
- selecting as a block under test a block within the first image frame using the processor,
- determining, with the processor, the forward estimation motion vector for the block under test,
- finding, with the processor, a block within the second image frame to which the forward estimation motion vector is pointing,
- determining, with the processor, the backward estimation motion vector for the found block, and
- comparing, with the processor, the determined forward estimation motion vector and the determined backward estimation motion vector, the determined forward motion vector being unreliable and subject to removal when the determined backward motion vector points to a block other than the block under test, and the image background regions covered by the object and the image background regions left uncovered by the object are determined by
- assigning, with the processor, a forward motion vector reliability indicator to each block in the first image frame based on a reliability determination for forward estimation motion vectors corresponding to each block,
- assigning, with the processor, a backward motion vector reliability indicator to each block in the second image frame based on a reliability determination for backward estimation motion vectors corresponding to each block, and
- computing, with the processor, a final indicator identifying an image background regions as covered by the object or as left uncovered by the object.

5. A system for providing reliable motion vectors, comprising:

circuitry configured to determine motion vectors between a first image frame and a second image frame with backward estimation, the first image frame preceding the second image frame;

determine motion vectors between the first image frame and the second image frame with forward estimation;

compare backward estimation motion vectors and forward estimation motion vectors;

detect unreliable motion vectors based on a comparison result;

determine image background regions covered by an object and image background regions left uncovered by the object based on unreliable motion vectors;

remove the unreliable motion vectors; and replace removed unreliable motion vectors with reliable, predetermined background motion vectors, wherein in comparing the backward estimation motion vectors and the forward estimation motion vectors, the circuitry is further configured to
- select as a block under test a block within the first image frame,
- determine the forward estimation motion vector for the block under test,
- find a block within the second image frame to which the forward estimation motion vector is pointing,
- determine the backward estimation motion vector for the found block, and
- compare the determined forward estimation motion vector and the determined backward estimation motion vector, the determined forward motion vector being unreliable and subject to removal when the determined backward motion vector points to a block other than the block under test, and in determining the image background regions covered by the object and the image background regions left uncovered by the object, the circuitry is further configured to assign a forward motion vector reliability indicator to each block in the first image frame based on a reliability determination for forward estimation motion vectors corresponding to each block, assign a backward motion vector reliability indicator to each block in the second image frame based on a reliability determination for backward estimation motion vectors corresponding to each block, and compute a final indicator identifying an image background regions as covered by the object or as left uncovered by the object.

6. A non-transitory computer-readable medium having computer-readable instructions stored thereon, the computer-readable instructions when executed by a computer cause the computer to perform a method comprising:

determining motion vectors between a first image frame and a second image frame with backward and forward estimation, the first image frame preceding the second image frame;

comparing backward estimation motion vectors and forward estimation motion vectors;

detecting unreliable motion vectors based on a comparison result;

determining image background regions covered by an object and image background regions left uncovered by the object based on detected unreliable motion vectors;

removing the unreliable motion vectors; and replacing removed unreliable motion vectors with reliable, predetermined background motion vectors, wherein an unreliable motion vector is detected by selecting as a block under test a block within the first image frame, determining the forward estimation motion vector for the block under test, finding a block within the second image frame to which the forward estimation motion vector is pointing, determining the backward estimation motion vector for the found block, and comparing the determined forward estimation motion vector and the determined backward estimation motion vector, the determined forward motion vector being unreliable and subject to removal when the determined backward motion vector points to a block other than the block under test, and the image background regions covered by the object and the image background regions left uncovered by the object are determined by assigning a forward motion vector reliability indicator to each block in the first image frame based on a reliability determination for forward estimation motion vectors corresponding to each block, assigning a backward motion vector reliability indicator to each block in the second image frame based on a reliability determination for backward estimation motion vectors corresponding to each block, and computing a final indicator identifying an image background regions as covered by the object or as left uncovered by the object.

7. A method according to claim 1 or 4, wherein the step of comparing includes calculating the vector distance between the compared motion vectors, preferably calculating the Euclidian or Manhattan distance.

8. A method according to claim 7, wherein the step of comparing includes detecting whether the calculated vector distance exceeds a predefined threshold.

9. An electronic device, preferably a television, comprising a system according to claim 2 or 5.

* * * * *